Feb. 7, 1967     W. I. TIBBITTS ET AL     3,302,549
ATMOSPHERE DISTRIBUTING APPARATUS
Filed Oct. 2, 1964     2 Sheets-Sheet 2
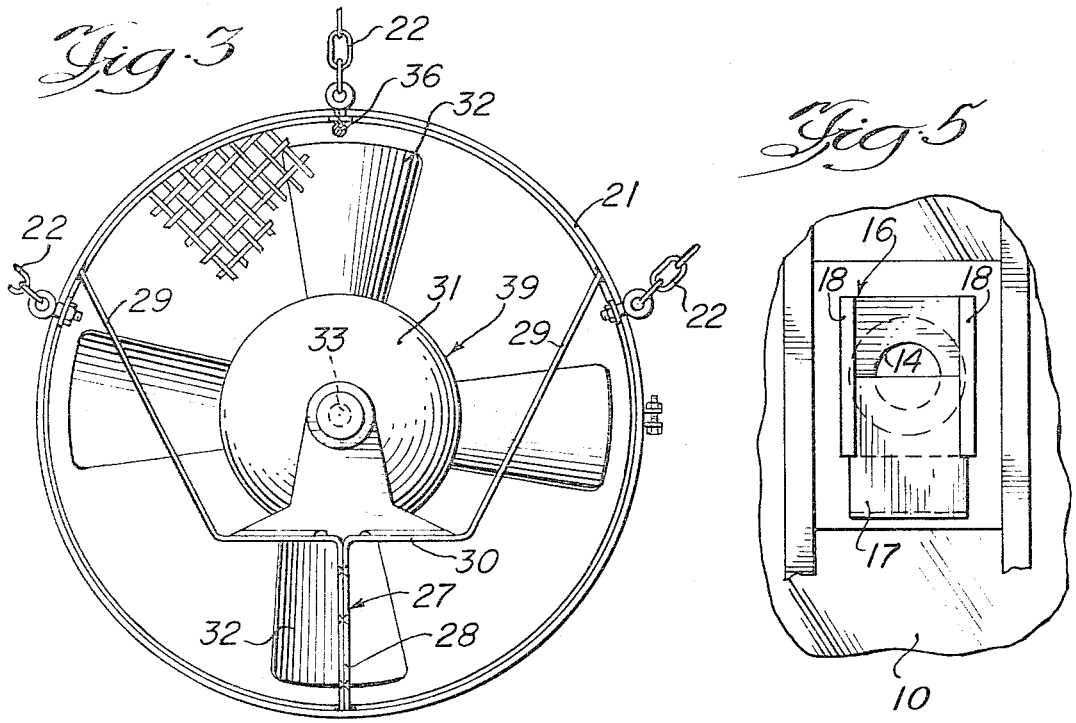
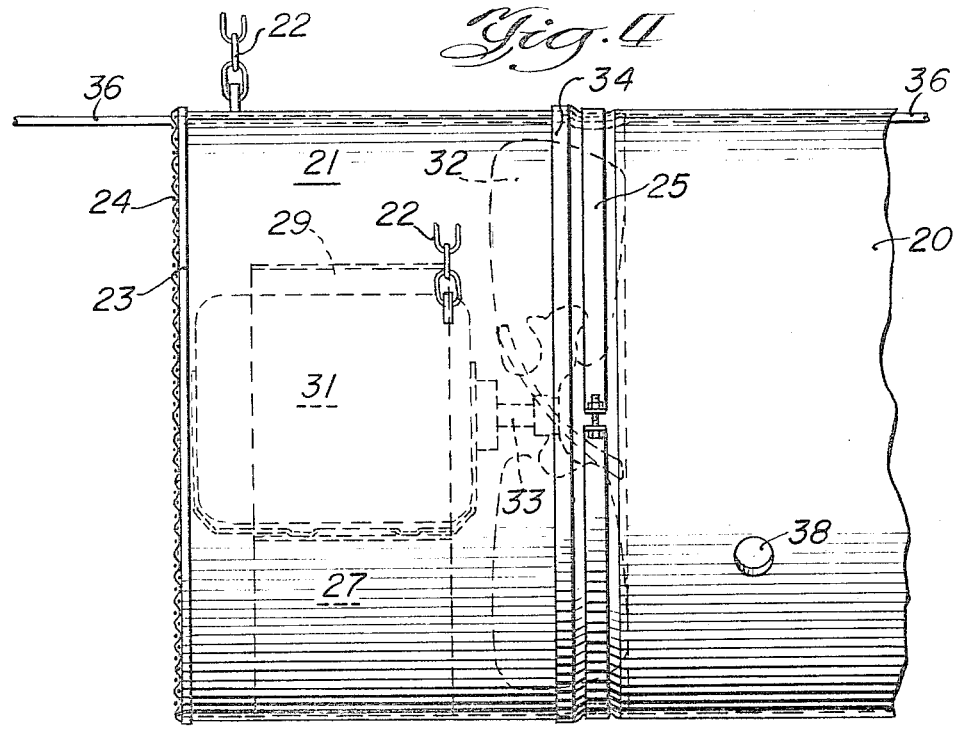

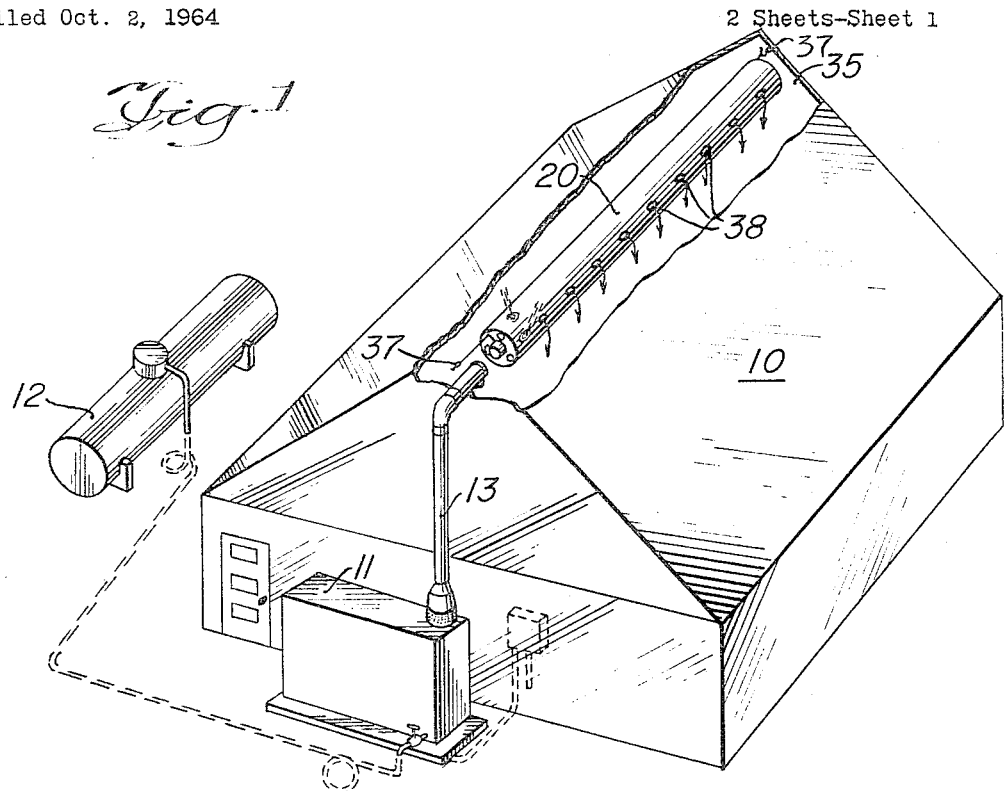
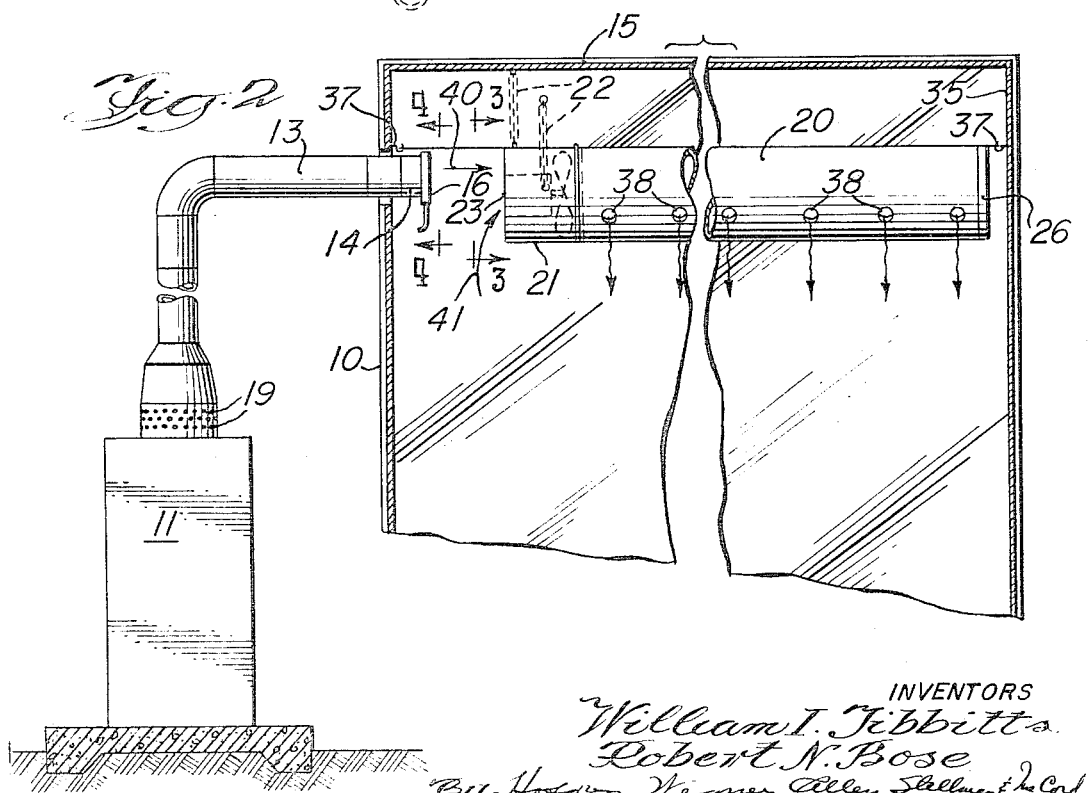

United States Patent Office 3,302,549
Patented Feb. 7, 1967

3,302,549
ATMOSPHERE DISTRIBUTING APPARATUS
William I. Tibbitts and Robert N. Bose, both of St. Joseph, Mich., assignors to Whirlpool Corporation, a corporation of Delaware
Filed Oct. 2, 1964, Ser. No. 401,147
3 Claims. (Cl. 98—38)

This invention relates to an apparatus for providing a carbon dioxide rich growth promoting atmosphere in an enclosure such as a greenhouse for growing plants.

It has long been known that plant growth can be stimulated by exposing them to an atmosphere containing a higher amount of carbon dioxide than is found in normal air. Various apparatus have been proposed for generating such a carbon dioxide rich atmosphere, and one such type of apparatus is disclosed and claimed in Bose, Tibbitts and Ranum application Serial No. 382,148, filed July 13, 1964, and assigned to the same assignee as the present application. In this copending application there is disclosed, for illustrative purposes only, a semi-diagrammatic showing of a distributing system for distributing a carbon dioxide rich atmosphere in a greenhouse.

One of the features of this invention is to provide an improved distributing system for providing a carbon dioxide rich growth promoting atmosphere in an enclosure for growing plants.

Other features and advantages of the invention will be apparent from the following description of one embodiment thereof taken in conjunction with the accompanying drawings. Of the drawings:

FIGURE 1 is a perspective view partially broken away showing an apparatus embodying the invention installed in a typical greenhouse.

FIGURE 2 is a vertical sectional view through the peak of the greenhouse, partially broken away for clarity of illustration.

FIGURE 3 is a vertical sectional view taken substantially along line 3—3 of FIGURE 2.

FIGURE 4 is an enlarged side elevational view of a portion of FIGURE 2.

FIGURE 5 is an enlarged, fragmentary, vertical sectional view taken substantially along line 5—5 of FIGURE 2.

In the illustrated embodiment the greenhouse 10 is provided with a generator 11 for generating a carbon dioxide rich atmosphere by burning a hydrocarbon fuel from a fuel supply 12. As mentioned above, such a generator is disclosed in the above Bose et al. application 382,148.

From the generator 11 a pipe 13 leads to the greenhouse and extends into one end of the greenhouse, as indicated at 14, immediately below the peaked roof 15.

With this arrangement carbon dioxide rich gases flowing through the pipe 13 empty into one end of the greenhouse and this supply is controlled by a slidable valve 16 on the projecting end 14 of the pipe 13. In the illustrated embodiment, this valve 16 includes a vertically slidable flat plate 17 guided in its movement by side channels 18 to expose desired areas of the pipe end 14. The position of the plate 17, of course, determines the amount of gases from the generator 11 that are permitted to flow into the greenhouse. At the position shown in FIGURE 5, about one-half of the opening 14 is exposed. By moving the valve plate 17 downwardly, the entire opening would be exposed.

Conversely, by moving it completely upwardly the entire opening 14 would be closed, so that no gases could flow into the greenhouse. The opening and closing of the valve plate 17, of course, changes the back pressure of the gases within the pipe 13. When this back pressure becomes great enough, as when the plate 17 is entirely closed, gases from the generator 11 will flow out into the ambient atmosphere as by way of the openings 19, shown in FIGURE 2. In other words, the generator 11 is arranged to run constantly, with the amount of carbon dioxide rich gases flowing into the greenhouse being regulated between full supply and zero supply by positioning the valve plate 17.

The generator 11 and accompanying equipment including the pipe 13 constitute supply means for supplying atmosphere to the enclosure 10. The enclosure also includes atmosphere distributing duct means 20, preferably in the form of a flexible tube that may be made of plastic material such as polyethylene or polypropylene.

One end of the tube or duct means 20 is attached to a horizontally arranged cylindrical rigid housing 21 which may be made of metal or rigid plastic. This housing is supported from the roof of the greenhouse 10 by supporting chains 22 so that the housing 21 is held substantially horizontal.

The housing 21, as is shown in FIGURE 2, is located adjacent but spaced from the outlet valve 16 of the atmosphere supply pipe 13. The one end 23 of the housing 21 that is adjacent the valve 16 is provided with a coarse screen 24 (FIGURE 4) that is used to prevent the entry into the housing of birds and other relatively large animals and bugs that might be accidentally drawn into the housing.

The other end of the housing 21 has attached to it one end of the tube or duct 20 as by a clamp 25. The other end of the tube is closed, as indicated at 26.

Located within the end housing 21 is a supporting bracket 27 of generally Y shape with a vertical bottom leg 28 and outwardly flared side legs 29 that are spaced apart by a substantially horizontal flat base 30. The ends of the legs 28 and 29 are attached as by welding to the inner surface of the housing 21 to provide a rigid support for an electric motor 31 mounted on the flat base 30. As can be seen from the drawings the tube 20 and the housing 21 have coinciding central axes, the bracket 27 is arranged substantially parallel thereto and the axis of the motor 31 substantially coincides therewith.

The motor 31 is part of an electrically operated blower unit which is completed by a blower fan 32 mounted on the forward end of the forwardly extending motor shaft 33. The fan 32 is positioned in front of the mounting bracket 27 and at the juncture of the tube 20 and the housing 21.

The duct or tube 20 extends substantially from end to end of the enclosure 10. The one end 34 is attached to the blower housing 21 by the clamp 25, as previously described. The other end 26 which is closed is similarly located adjacent the other end 35 of the enclosure. In the embodiment illustrated, the tube 20 is supported by a line 36 which may be a metal wire extending between hooks 37 mounted on the end walls of the enclosure 10.

As the extreme end 26 of the tube 20 is closed efficient and uniform distribution of atmosphere flowing through the tube 20 is provided by spaced openings 38 in the tube. These openings are shown in exaggerated size in FIGURES 1 and 2 in order to illustrate their purpose. These openings are arranged on opposite sides of the tube and below the horizontal plane passing through the central axis of the tube so that at least some of the openings will exhaust outwardly and downwardly to direct atmosphere from the tube to the lower regions of the enclosure 10 in which the plants (not shown) are grown.

As can be seen from the above description the atmosphere distributing apparatus including the tube 20 and the atmosphere moving blower are very lightweight and are portable in that they can be moved from one greenhouse to another and can be removed entirely when not needed. Installation is very simple as the supporting wire 36 is merely attached to the hooks 37 to support the flexible tube 20 while the blower and its casing are easily releasably supported from the chains 22.

In operation the blower 39 blows atmosphere to the right through the tube, as viewed in FIGURES 1, 2 and 4. The end 23 of the blower housing 21 therefore constitutes the suction end and through this end is drawn atmosphere from the pipe 13 when the valve 17 is at least partially open as well as atmosphere from within the enclosure 10, both as indicated by the arrows 40 and 41. This provides an arrangement whereby the atmosphere within the enclosure is circulated substantially uniformly to all parts of the enclosure and wherein controlled amounts of fresh atmosphere are introduced from a generator 11 as desired.

This invention provides for even distribution of atmosphere throughout the entire enclosure or greenhouse. It also recirculates the atmosphere within the enclosure in a more uniform manner than heretofore achieved and therefore permits elimination of the usual greenhouse circulating fans. In addition, it provides for adding a selected, variable volume of fresh atmosphere from a generator, such as the generator 11, or of shutting off the fresh atmosphere supply as desired.

In the preferred construction, as shown in the drawings, the atmosphere circulating system including the duct 20 and blower 39 is positioned just below the roof peak 15 where it is above the growing plants in order that the distribution of atmosphere to the plants will be uniform. The distribution system of this invention also permits uniform distribution of internal heat to the growing plants and provides uniform humidity throughout the enclosure which aids in preventing mold growth on the plants.

The arranging of the inlet end 23 of the blower and blower housing adjacent and opposite the outlet valve 16 of the atmosphere supply pipe 13 results in substantially all fresh atmosphere being drawn into the blower and distributed uniformly through the enclosure by the duct 20. This prevents the relatively heavy carbon dioxide rich atmosphere striking the plants in heavy concentration immediately beneath the valve 16. Where plants are subjected to such a heavy concentration of carbon dioxide severe damage has been observed. The distribution system of this invention is so efficient that heavy concentrations of carbon dioxide are avoided.

A very important advantage of the distribution system of this invention is that it can be supported by the relatively lightweight frame of conventional greenhouse structures. Thus, no auxiliary supporting members are required.

Having described our invention as related to the embodiment shown in the accompanying drawings, it is our intention that the invention be not limited by any of the details of description, unless otherwise specified, but rather be construed broadly within its spirit and scope as set out in the accompanying claims. The embodiment of the invention in which an exclusive property or privilege is claimed is defined as follows:

1. Apparatus in an enclosure for distributing a growth promoting in said enclosure for growing plants, comprising: supply means for supplying said atmosphere; distributing duct means above said plants; fluid flow activating means in said duct means for effecting the flow of atmosphere through said duct means, said duct means having outlet passages spaced therealong for distributing atmosphere from the duct means to the plants; means for selectively delivering and preventing delivering of said growth promoting atmosphere from said supply means into said duct means; and means for introducing enclosure atmosphere into said duct means for recirculation in said enclosure selectively with or without additional growth promoting atmosphere from said supply means, whereby when said means for selectively delivering and preventing delivering is preventing delivery of growth promoting atmosphere, recirculation of enclosure atmosphere only is achieved by way of said duct means.

2. The apparatus of claim 1 wherein said duct means has an open end portion, said flow activating means is located within said end portion, said supply means has an exit emptying into said enclosure, and said open end portion of the duct means is spaced from said supply means within said enclosure so that said duct means open end portion is receivable of atmosphere from both said supply means and said enclosure.

3. The apparatus of claim 1 wherein the supply means is arranged to form said growth promoting atmosphere constantly and to discharge exteriorly of said enclosure that portion thereof which is not delivered into said duct means.

References Cited by the Examiner

UNITED STATES PATENTS 2,857,108  10/1958  Wallace _____ 237—53

FREDERICK L. MATTESON, Jr., *Primary Examiner.*

C. R. REMKE, *Assistant Examiner.*